United States Patent
Williams

(10) Patent No.: US 8,917,841 B2
(45) Date of Patent: Dec. 23, 2014

(54) CALL SCREENING REDUCTION SYSTEM

(75) Inventor: Michael Williams, Edmonton (CA)

(73) Assignee: Advanis Inc., Edmonton, Alberta (CA)

(*) Notice: Subject to any disclaimer, the term of this patent is extended or adjusted under 35 U.S.C. 154(b) by 211 days.

(21) Appl. No.: 13/538,015

(22) Filed: Jun. 29, 2012

(65) Prior Publication Data

US 2013/0010936 A1  Jan. 10, 2013

Related U.S. Application Data

(60) Provisional application No. 61/504,553, filed on Jul. 5, 2011.

(51) Int. Cl.
*H04M 1/56* (2006.01)
*H04M 15/06* (2006.01)
*H04M 3/436* (2006.01)

(52) U.S. Cl.
CPC .................................. *H04M 3/436* (2013.01)
USPC ............. 379/142.06; 379/201.08; 379/220.01

(58) Field of Classification Search
USPC ............................ 379/142.06, 201.08, 220.01
See application file for complete search history.

(56) References Cited

U.S. PATENT DOCUMENTS

| 8,369,495 B1* | 2/2013 | Mallenahally Channakeshava | 379/88.18 |
| 2007/0127703 A1* | 6/2007 | Siminoff | 379/372 |

* cited by examiner

*Primary Examiner* — Simon King
(74) *Attorney, Agent, or Firm* — Bennett Jones LLP

(57) ABSTRACT

A system and a method for conducting a telephone survey, which reduce the number of calls that are not answered by survey participants, are provided. The system comprises means of making outbound telephone calls with a selected call display number, storing a call record for each outbound call, and routing inbound telephone calls to a voicemail or interactive phone system if the inbound calling number is identifiable from the stored call records. The method comprises the steps of making outbound calls to survey phone numbers with the call display set to a local phone number, storing a call record with each outbound call, and routing inbound calls to a voicemail or interactive phone system if the inbound call number is identifiable from the stored call records.

4 Claims, 3 Drawing Sheets

CALL SCREENING REDUCTION SYSTEM

CROSS REFERENCE TO RELATED APPLICATIONS

This application claims the priority benefit of U.S. Provisional Application No. 61/504,553 filed on Jul. 5, 2011, entitled "Call Screening Reduction System", the entire contents of which are incorporated herein by reference.

FIELD OF THE INVENTION

The present invention relates to a system and method for conducting a telephone survey with a reduced number of telephone calls that are not answered by telephone survey participants.

BACKGROUND OF THE INVENTION

Telephone surveys are routinely performed by businesses of customers or prospective customers to determine consumer feedback, preferences or trends. These survey calls are typically made from call centres which may not be local to the survey area. However, with the widespread use of "call display" systems which display information about an incoming call, many individuals will decline to answer a call if the incoming caller identification is from another area code, or if it displays a toll free number such as a 1-800 number, either of which may be indicative of a telephone solicitation call. If the phone that is called is a wireless phone, the caller ID is often not displayed, only the caller number display.

In the past, the costs and timing to setup a set of local numbers was prohibitive. It is only in the past couple of years that it has even been possible to acquire local numbers in areas where a business did not have a physical location. And even more recently has it become reasonably inexpensive to acquire purchase local numbers that are forwarded using Voice Over Internet Protocol (VOIP) providers.

It would be advantageous to those conducting the telephone survey to maximize the number of answered calls and minimize the number of calls which are ignored or not answered.

SUMMARY OF THE INVENTION

The present invention relates to a system and method of reducing call screening by consumers selected to participate in a telephone survey, and, in one embodiment, to increase the number of calls that are called back if the call is not answered.

In one aspect, the invention comprises a method of conducting a telephone survey by calling a plurality of prospective survey participants, each having a survey phone number in a survey area code, which method comprises the following steps:

(a) obtaining at least one local phone number with the same area code as the survey area code;
(b) setting a telephone system to display the at least one local phone number as a caller display number;
(c) calling at least one survey phone number in the survey area code using the telephone system.

In one embodiment, the at least one local phone number is associated with a local caller ID that is not associated with a telemarketer and the local caller ID is used when calling each of the survey phone numbers.

In one embodiment, at least one local phone number is obtained in each of a plurality of survey area codes.

In one embodiment, the method comprises the further steps of:

(a) storing in a memory the at least one survey phone number along with a survey identifier; and
(b) if a call is received from the at least one survey phone number which is identifiable from the memory, routing the incoming call to an interactive voice system associated with the survey identifier; and
(c) if a call is received from the at least one survey number which is not identifiable from the memory, routing the incoming call to a generic voice message.

In another aspect, the invention comprising an internet protocol telephone system operatively connected to the Internet, said telephone system comprising a memory containing a set of program instructions and a processor comprising components responsive to the program instructions to implement the following procedures: sending telephone calls with a selected caller display number and a selected caller ID; storing information in the memory regarding an outgoing telephone call including the called number, and a survey identifier; receiving telephone calls and determine if the calling number is identifiable from the memory; routing the incoming calls with identifiable calling numbers to a selected voicemail box or interactive phone system.

BRIEF DESCRIPTION OF THE DRAWINGS

Each of the embodiments depicted in the drawings are but one of a number of possible arrangements utilizing the fundamental concepts of the present invention. The drawings are briefly described as follows.

DETAILED DESCRIPTION OF PREFERRED EMBODIMENTS

The invention relates to a system and method of reducing call screening by consumers selected to participate in a telephone survey. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

In general terms, the present invention comprises a method and system to reduce the number of calls that are not answered by consumers because they think the caller is a telemarketer. Instead of displaying a phone number that is a toll free number, a local phone number is displayed. As used herein, a "local phone number" includes a phone number which is not considered long distance to the survey phone number. A local phone number may or may not have the same area code as the survey phone number, so long as it is assigned to the same metropolitan area. For example, the (416) area code is local to the (905) area code in the metropolitan Toronto area, as calls may be routed between the two area codes without long distance toll charges, using 10 digit local dialing. Local phone numbers are available within a local calling area.

Furthermore, where possible, a caller ID is chosen and displayed which is specific to each survey project. Thus, to a prospective survey participant on a landline, the call number display shows a local phone number, and the caller ID displays an identification which is clearly not a telemarketer. To a prospective survey participant on a mobile phone line without caller ID, but with call number display, a local phone number is displayed.

In one embodiment, the system and method are configured to accommodate a plurality of different survey projects which are undertaken in a plurality of local calling areas. For example, a survey project may include local calling areas in a specific region, or every local calling area in the United States and Canada.

Figure 1:
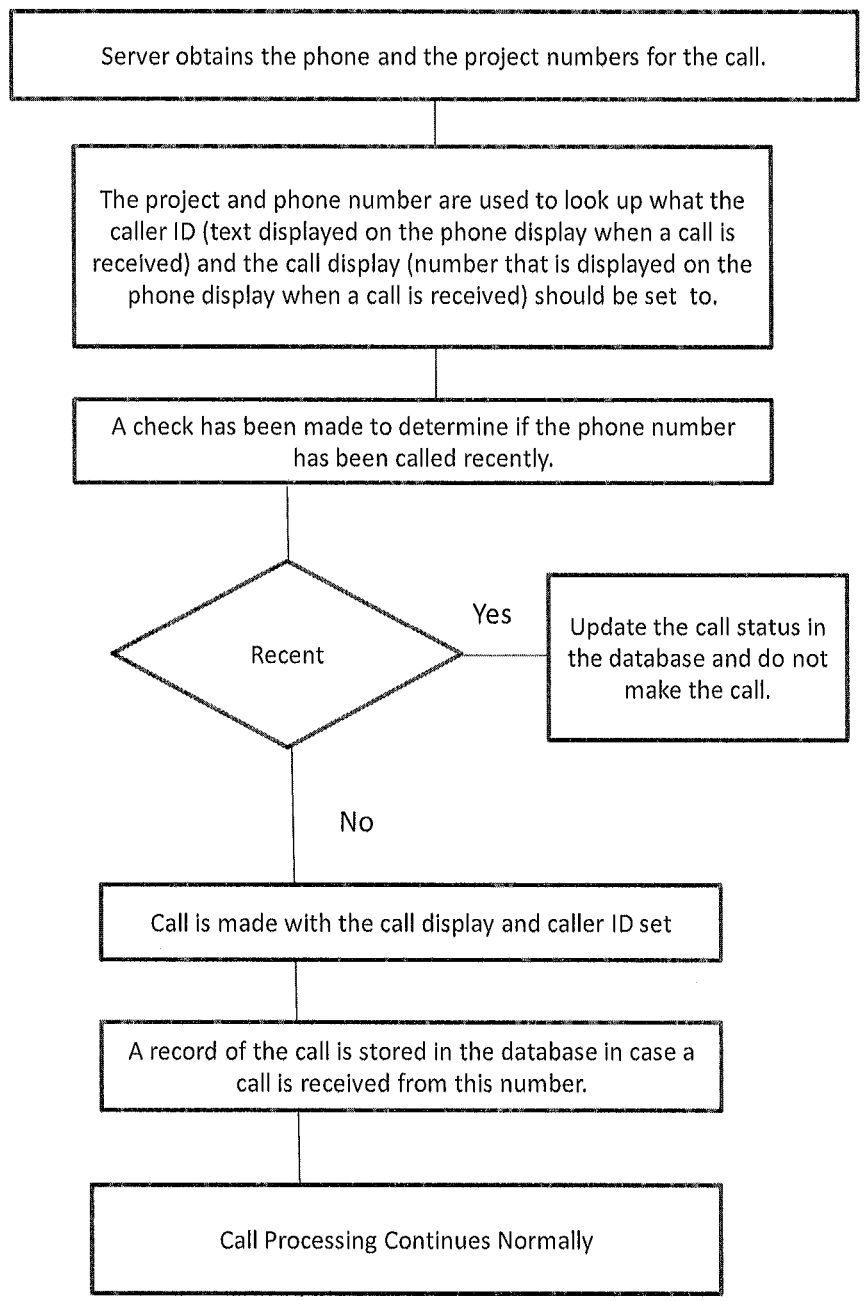
FIG. 1 is a schematic flowchart showing handling of outbound call processing.

Referring to FIG. 1, outbound call processing is handled as follows. The survey conductor obtains the project number of the survey project, and the survey phone number (10), A local phone number is chosen which is associated with the survey project (15). Also, a caller ID is chosen which is associated with the survey project and the local phone number (15). In some regions, this caller ID is ignored by the telephone system. All available local phone numbers and local caller IDs may be stored in a survey database (120), along with survey information.

A check is made to determine if the survey phone number has been recently called (20). If the survey phone number has been recently called, the call status is updated in a database (110) and the call is not made (25). If the survey phone number has not been recently called, then the call is made (30), and a record of the call is stored (35) in a database (110). The call record (110) may comprise the survey phone number, the selected local phone number, the selected caller ID, the survey project, and the time and date of the call.

Figure 2:
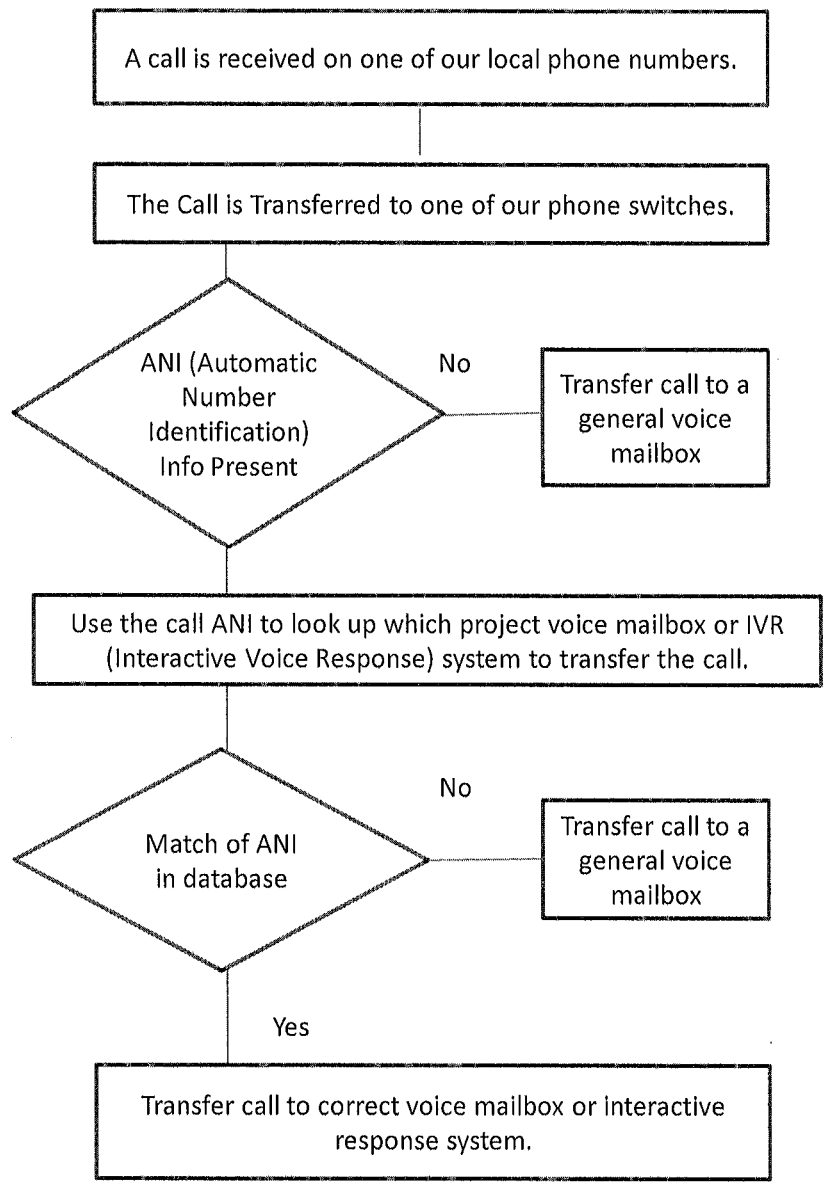
FIG. 2 is a schematic flowchart showing handling of inbound call processing.

If the call is unanswered, there is a possibility that the prospective survey participant may return the call. Many people who see a missed call on their phone, will return the call in case it was a call they wanted to take. Referring to FIG. 2, inbound call handling is processed as follows. If a call is received on the selected local phone number (40), it is switched to a main phone switch (45) and the system will determine if Automatic Number Identification (ANI) (112) is present (50). If it is not, then the call is transferred to a general voice mail box (114) where the caller can listen to a prerecorded message and leave a message (55). If ANI is present, the system determines whether ANI is matched in the call record database (110) (60). If ANI is present, but is not matched in the call record database (110), then the call is transferred to the general voice mail box (114) (65). If the ANI is matched in the database, then the specific survey project associated with the original outbound call is identified, and the call is transferred to a project voicemail box (116) specific to that survey project, or to an interactive voice response system (118) which may be navigated by the caller using voice or number pad inputs (70).

Figure 3:
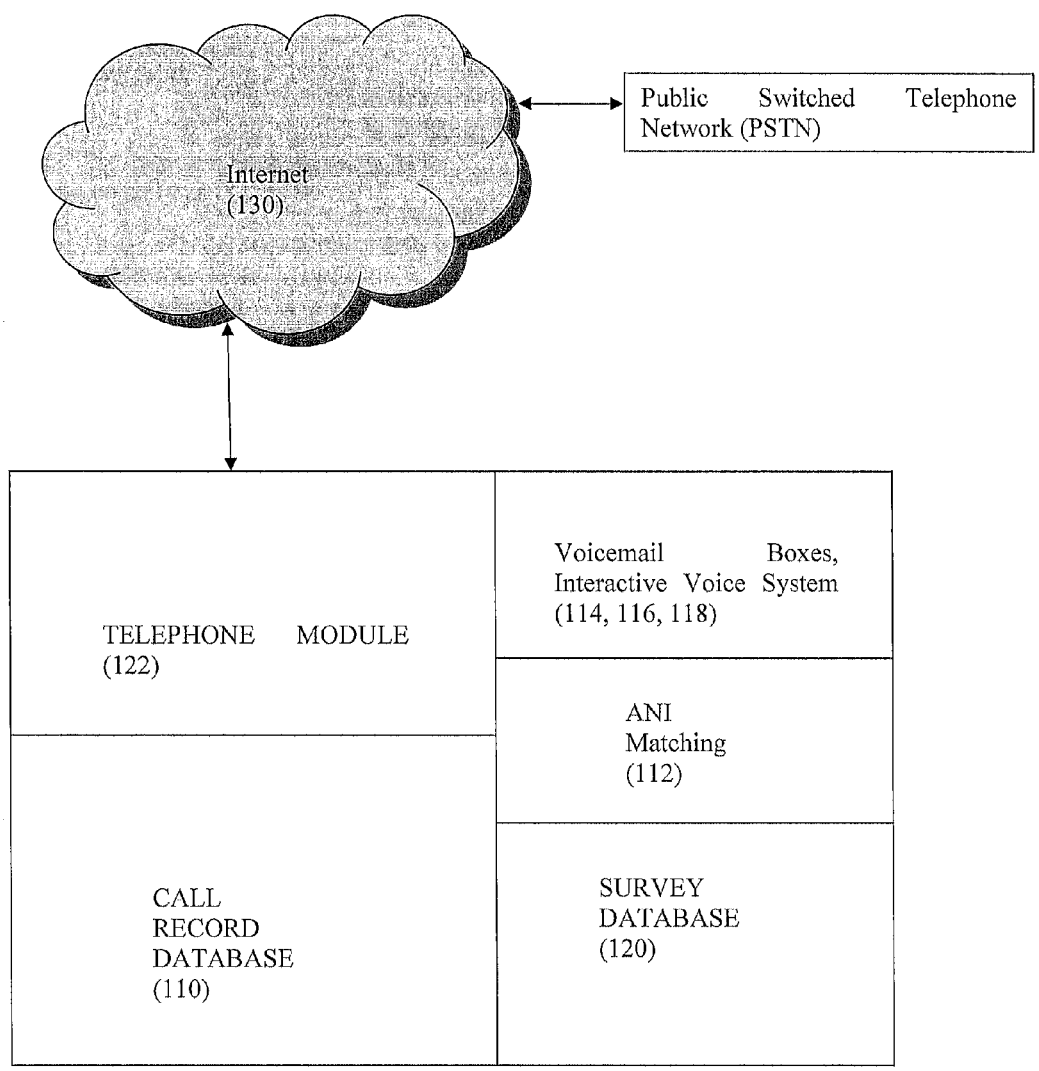
FIG. 3 is a schematic representation of one embodiment of a system of the present invention.

As shown schematically in FIG. 3, in one embodiment, the system comprises a computerized phone server (100) which implements a Voice over Internet Protocol system (VOIP). The phone server includes a memory for storing the call record database (110) as well as the survey database (120), and a telephone module processor (122) for executing the telephone software program, and an Internet (130) connection. The VOIP system connects by the Internet (130) to a public switched telephone network (PSTN) as is well known in the art. Suitable VOIP systems are well known in the art and are commercially available.

The telephone software program comprises modules for selecting a local phone number to be set as a caller display number and selecting a caller ID for the outbound call, both selections from the survey database, and associating that number and ID with a particular survey project identifier. The software program further comprises a module for processing inbound telephone calls (112), which determines if the incoming call has Automatic Number Identification (ANI) information, and matches the incoming call to a stored call record if ANT information is present. As those skilled in the art are aware, ANI is different from call number display or caller ID and allows capturing of the caller's telephone number even if caller ID blocking is activated on the caller's line.

The system components shown in the Figures or described above may be or may include a computer or multiple computers. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer. Any suitable programming language or combinations of languages may be used in accordance with the various embodiments of the invention.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

As will be apparent to those skilled in the art, various modifications, adaptations and variations of the foregoing specific disclosure can be made without departing from the scope of the invention claimed herein.

What is claimed is:

1. A method of conducting a telephone survey by calling a plurality of prospective survey participants, each having a survey phone number in a survey area code, which method comprises the following steps:
   (a) obtaining, through a telephone survey system, at least one local phone number in the same local calling area as the survey area code;
   (b) setting a telephone system to display one of the local phone numbers as a caller display number;
   (c) calling, through a telephone survey system, at least one survey phone number in the survey area code with the telephone system; and
   (d) storing in a memory the at least one survey phone number along with a survey identifier; and
   (e) if a call is received from the at least one survey number which is identifiable from the memory, routing the incoming call to an interactive voice system associated with the survey identifier; and
   (f) if a call is received from the at least one survey number which is not identifiable from the memory, routing the incoming call to a generic voice message.

2. The method of claim 1 wherein the at least one local phone number is associated with a local caller ID that is not associated with a telemarketer, and the local caller ID is used when calling each of the survey phone numbers.

3. The method of claim 1 wherein at least one local phone number is obtained in each of a plurality of survey area codes.

4. A telephone survey system, comprising an Internet protocol telephone system operatively connected to the Internet, said telephone system comprising:
   (a) a memory containing a set of program instructions; and
   (b) a processor comprising components responsive to the program instructions to implement the following procedures:
      (i) calling a survey phone number in a survey area code with a local phone number as a caller display number;
      (ii) storing the survey phone number along with a survey identifier; and
      (iii) if a call is received from the stored survey number, routing the incoming call to an interactive voice system associated with the survey identifier; and
      (iv) if a call is received from a survey phone number which is not identifiable, routing the incoming call to a generic voice message.

* * * * *